Oct. 21, 1947.   N. T. VOLSK   2,429,248
MECHANICAL PRESSURE GAUGE
Filed May 17, 1943   2 Sheets-Sheet 2

*INVENTOR.*
NICHOLAS T. VOLSK
BY
*ATTORNEYS*

Patented Oct. 21, 1947

2,429,248

UNITED STATES PATENT OFFICE 2,429,248

MECHANICAL PRESSURE GAUGE

Nicholas T. Volsk, Spring Lake, N. J.

Application May 17, 1943, Serial No. 487,293

7 Claims. (Cl. 73—419)

(Granted under the act of March 3, 1883, as amended April 30, 1928; 370 O. G. 757)

The invention described herein may be manufactured and used by or for the Government for governmental purposes without the payment to me of any royalty thereon.

This invention relates to a mechanical gauge, and more particularly to a device for recording the time-pressure relationships in explosion chambers when an explosive mixture is ignited.

Any device for measuring rapidly changing pressures must possess a sufficiently high natural frequency to faithfully follow the expected rates of change of pressure. The high frequency is also necessary for preventing an elastic oscillation of a system which may take place because of an impact of a suddenly applied pressure. At the same time, the device must be sufficiently sensitive to adequately respond to the anticipated pressure changes.

The relationship between the natural frequency and the sensitivity of a simple mechanical spring may be observed from the law which governs the natural frequency of elastically vibrating bodies which reads:

$$f = \tfrac{1}{2}\sqrt{\frac{gK}{W}}$$

where $f$ = natural frequency of spring in cycles per second.

$g$ = constant of gravity, $\dfrac{386 \text{ inches}}{(\text{sec.})^2}$ $K$ = constant of spring in pounds-load per inch displacement.

$W$ = weight of the moving parts in pounds.

If an instrument is to possess high natural frequency, then the two variables at one's disposal, namely, the constant of the spring and its weight, must be very carefully proportioned. The spring constant must be made as high as practicable, and the weight of the moving parts must be maintained at a minimum.

In most instruments where a high natural frequency is desirable, the strains to which the parts are subjected are very small, and the desired result is obtained by decreasing the size of all moving parts, and by using the lightest materials it is possible to use. Good examples of this are oscillograph vibrators, short period galvanometers, microphones, piezoelectric gauges, etc.

In the present case, the instrument must withstand ballistic pressure, and steel is the only material the physical properties of which satisfy the requirements. It is impossible, therefore, to use materials of low specific gravity, nor is it possible to reduce the dimensions of the moving parts below the safety limits. It is thus evident that $K$, the constant of the spring, must be made very high. This can be done only by stiffening the spring, and thus reducing the elastic displacement under load. At the same time any reduction in the elastic displacement for a given load reduces the sensitivity of the instrument in direct proportion.

The invention represents a mechanical structure in which the elements are given such configuration and connections that their sensitivity is higher, their weight is lower, and the natural period with the available sensitivity higher than the periods, the sensitivity, and the weight of the systems heretofore available.

It is, therefore, an object of the present invention to provide a mechanical gauge possessing high sensitivity, low weight, and high natural frequency for the available sensitivity.

It is a further object of the present invention to provide a mechanical gauge for measuring time-pressure relationships which is relatively simple in construction, and admirably adapted to perform its intended functions.

These and other objects and advantages are attained by providing a structure which includes a pair of series-connected elastic members one of which, when subjected to pressure developed in the explosion chamber, functions as a tension spring, and the other as a compression spring. The combined displacement of the compression spring and of the tension spring is transmitted by a push rod to an optical system, which records, by means of a focused beam of light, the time-pressure relationships on a light sensitive film moving at a uniform and known velocity.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which:

Figure 1:
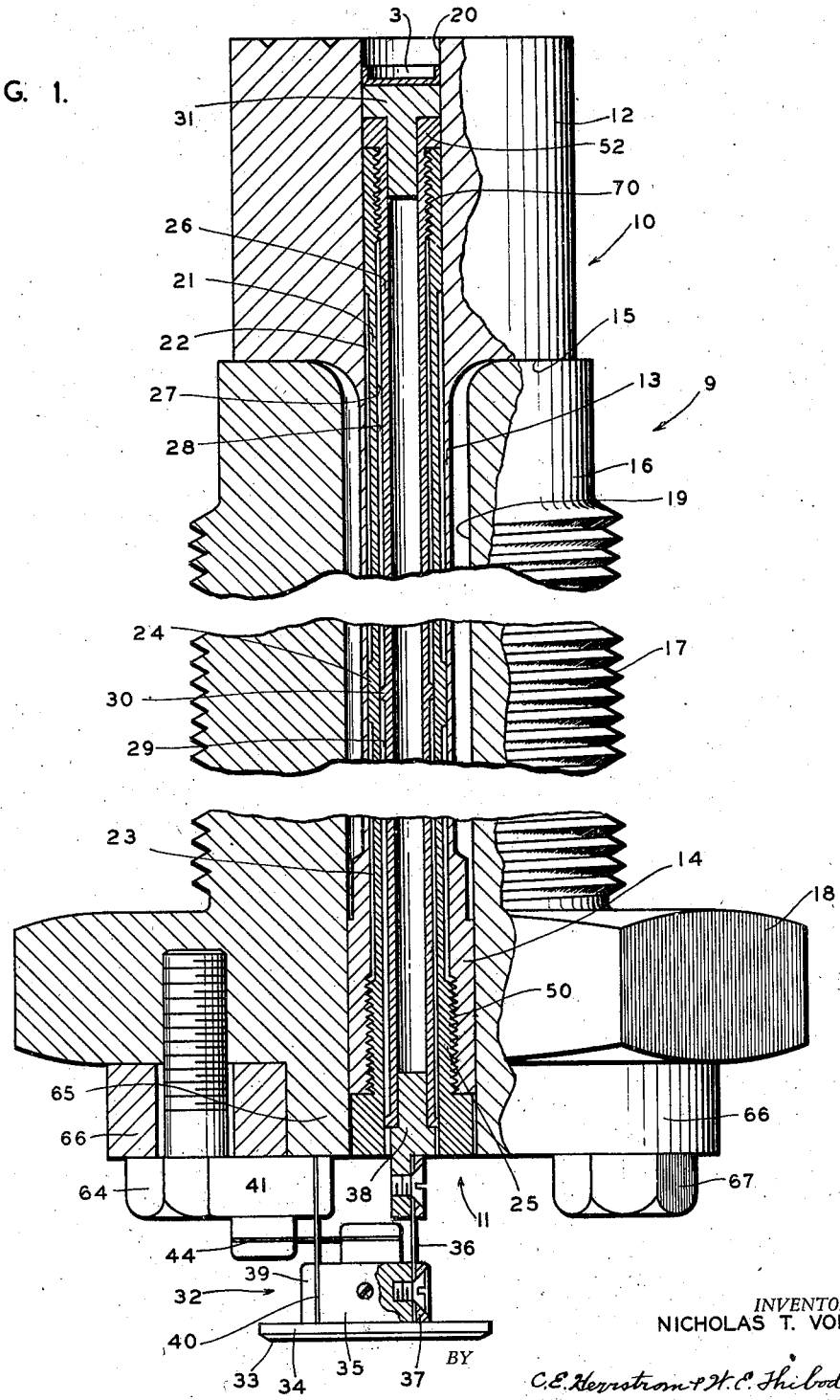
Figure 1 is a longitudinal sectional view of a time-pressure gauge made in accordance with the present invention.
Figure 2:
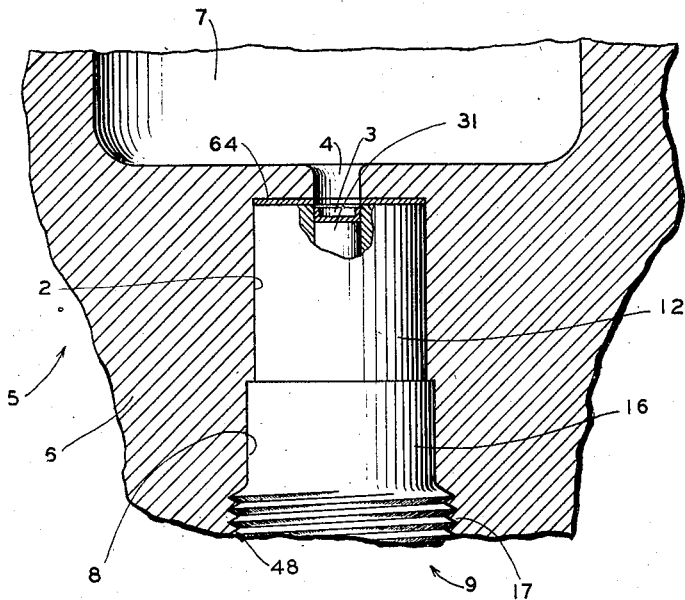
Figure 2 is a fragmentary sectional view of an explosion chamber showing the relative location of the gauge with respect to the explosion chamber.

Referring to Figures 1 and 2 of the drawings, the numeral 5, in Fig. 2 generally designates a portion of an explosion chamber used for testing explosive materials to obtain the thermochemical characteristics thereof. The chamber includes a wall 6 of considerable thickness enclosing a space 7, the wall being provided with a stepped bore 48—8—2—4, the first mentioned bore part being interiorly threaded. The part 4 constitutes a port at the space 7, and the remainder of the bore receives the mechanical gauge of the present invention, generally designated by the reference character 9. The pressure opening 4 exposes a piston head 31 to the port or explosion chamber 7 through a gas check 3. While a more or less specific type of explosion chamber has been referred to, it is to be understood that the gauge of the present invention is not limited for use in connection therewith. The gauge may be used in any manner or with any chamber appropriate for obtaining the desired measurements.

The gauge 9 comprises a pair of elastic members 10 and 11, member 10 being a tension member, and member 11 being a compression member. The tension member 10 includes a cylindrical head 12 and an integral tubular tension spring 13, the spring portion terminating at its lower end in an enlarged slide bearing portion 14, which imparts lateral stability to the tension spring 13. The cylindrical head 12 fits into the bore 2, Fig. 2, and its upper end surface abuts (through a gas sealing copper washer 64) the upper end of the bore. The entire gauge assembly is held in place by a hollow plug 16, threaded at 17 to fit the bore 48 into which it is screwed, the upper end of the plug abutting the cylindrical head 12. The outer end of the plug 16 is provided with a nut portion 18 to enable its placement, and a terminal boss 65 for centering a ring 66 revolubly engaged on the outer end of the plug. The plug bore 19 freely surrounds the tension spring 13 and slidingly fits the portion 14 for the support thereof as above stated.

The spring 13 and head 12 are bored throughout their length to a uniform diameter as at 20, the lower portion of this bore being threaded at 50. Bore 20 holds at its inner end an obturator 3 made of soft copper, disposed against a piston head 31 in the bore, the hollow, tubular compression member 11, and an intermost hollow tubular push rod 26, having an enlarged head portion 52 directly under and against the piston head 31. The compression member 11 consists of a tubular spring 21 provided with exterior relieved parts 22 and 23 separated by a mid-length cylindrical bearing surface 24 in sliding engagement with the bore 20 of the tension spring 13, and provided, at its outer end, with an enlarged threaded portion 25 engaging a corresponding threaded portion 50 in the end of the bearing portion 14 of the spring 13. By this arrangement, the tension and compression springs 13 and 21 are effectively connected with each other in series so that any tension and compression strain respectively transmitted to one of these members is also transmitted to the other member, and, by utilizing the combined strains of these members as a basis of measurement, the sensitivity of the instrument is determined by the combined sensitivity of the tension and compression springs.

The upper end of the compression member 21 is threadedly engaged at 70 with the push rod 26 directly below its head 52. The push rod 26 is disposed within the bore 27 in the compression spring 21, and is relieved peripherally at 28 and 29 leaving a mid-length annular bearing surface 30 in sliding engagement with the bore of the compression spring 21.

The head 52 of the push rod 26 is suitably secured to the piston head 31, as by spot-welding. The piston head 31, the head 52 of the push rod, and the upper end of the compression spring 21 thus assembled, form part of a single elastic structure having a sliding fit within the bore 20 of the cylindrical head 12, the piston head 31 being positioned close to the extremity of the head 12 and in proximity to the explosion chamber 7. This proximity avoids the interposition between the explosion chamber and the piston head of an excessive column of gas which might otherwise be a source of undesirable oscillations and distortion of a true pressure wave from the test chamber.

Figure 3:
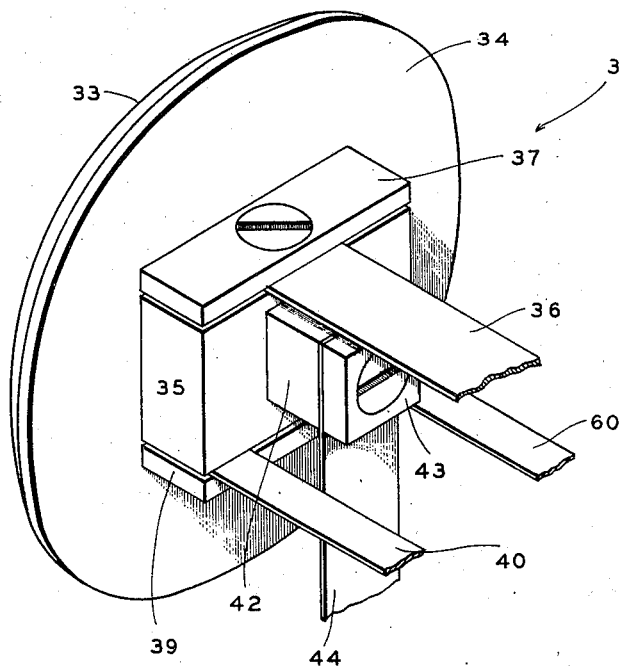
Figure 3 shows a perspective view of a portion of one form of a mirror suspension assembly which may be used in connection with the time-pressure gauge.

The outer end of the push rod 26, which extends substantially to the outer end of the boss 65, is connected to any appropriate mirror suspension assembly for photographically recording the movement of the push rod. A preferred form of the mirror suspension assembly 32 is shown in Figs. 1 and 3 of the drawings and including a mirror 33, its holder 34, and a back block 35 on the holder. It includes a mirror pivot assembly devised by E. M. Eden, National Physical Laboratory, England. (See Dictionary of Applied Physics, by Glazelbrook, vol. 3, pp. 625–627.) The pivot assembly consists of four flat, steel spring strips. Two spring strips, 40 and 60, Fig. 3, are set with extremities on a base 41 on the collar 66, in a plane parallel to the axis of the gauge and opposite ends in the block 35. Spring 36 is also set parallel to and nearer the axis of the gauge, and may coincide with it. The spring 36 connects the mirror assembly block 35 to the push rod 26, through a shouldered push pin 38 which fits into the bore of the push rod. A similar spring 44 is connected between the base 41 and block 35 in a plane normal to that of springs 40—60 midway of the connections of the latter with the base and block. This spring 44 extending between the springs 46—60 and equal distances on opposite sides of their plane, and being attached rigidly at its extremities to the base 41 and block 35, the latter having a boss 42 thereon for the purpose. The springs 40 and 60 connect the mirror assembly with the base 41, Fig. 1. Springs 40, 60 and 44, form a pivot support assembly for the mirror. All four springs have equal thickness and effective lengths, i. e., the length between the base 41 and block 35. Springs 36 and 44 are of equal width, while the width of springs 40 and 60 is equal to half that of the springs 44 and 36. Clamping plates 37, 39, and 43 and screws are used to clamp the springs 36, 40—60, and 44, on the block 35. The block 41 is mounted on the ring 66 surrounding base 65, the ring 66 being secured to the hollow plug 16 by means of bolts 64 and 67. Springs 40, 60, and 44 form the so-called cross spring suspension which responds to the movement of the push rod by bending.

The magnifying constant of this mirror suspension depends in part on the distance between the two planes of the springs which are parallel to the axis of the gauge, i. e., the distance between spring 36 and the plane of the springs 40—60. At the same time the angular displacement of the mirror assembly is proportional to the gauge elongation so long as the latter remains small in comparison with the distance between the parallel springs. The linear response of the mirror pivot assembly, as a rule, exceeds the range of the elongations ordinarily encountered with gauges of this type. In choosing a type of mirror control, it is necessary to choose the one which will form a single elastic system with the gauge. The angular displacement of the mirror should be proportional to the piston displacement, it should offer little resistance to the movement of the piston, and, at the same time, it should be stable and offer a reasonable amount of optical magnification. From the above considerations, it follows that the optical systems which use knife edges for the mirror control are not stable enough because it is difficult to keep the distance between the edges constant. Nor is it suitable to resort to the use of any gear arrangements, since no optical system using gears can form a single elastic system with the gauge. Since the elastic displacements of the gauge are extremely small, it is necessary to resort to as high an optical magnification as possible, and, if there is any defect in the mirror control system, it is amplified many times along with the elastic displacement on the gauge. The mirror pivot assembly illustrated in this specification avoids the above mentioned defects, and, although the elastic type of mirror control is not capable of furnishing as high a mechanical advantage (ratio of the lever arms) as that obtainable with the gears or knife-edge suspension, it is more stable, and, therefore, solves the mirror assembly problem more satisfactorily than other known systems.

When the gauge is subjected to pressure, the mirror 33 is deflected through an angle, whereby an incident beam or pencil of light (not shown) directed at the mirror is deflected through an angle proportional to the longitudinal movement of the push rod 26, thus faithfully recording in an amplified form the longitudinal movement of the push rod 26 on a light sensitive film (not shown) moving at a known and constant velocity, as is familiar in chronographs of various kinds.

The operation of the gauge may be briefly summarized as follows: A known quantity of explosive material is fired within the explosion chamber 7. The products of explosion exert a rapidly changing pressure against the gas check 3 and the head of the piston 31 which transmits this pressure to the compression spring 21 through the connection 52 of the push rod 26. The compression spring 21 transmits through the threaded portions 25 and 50 the pressure exerted on the piston head 31 to the tension spring 13 which is held in place by the cylindrical head 12 and the plug 16. Thus, both the compression and tension springs, which preferably have equal cross-sectional areas, are subjected to equal stresses, the compression spring being compressed and the tension spring being elongated. In view of the series connection between the tension and compression members and the engagement between the push rod and the piston 31 and compression member, the movement of the push rod will register the combined elastic displacements of the tension and compression members. This linear movement of the push rod is transformed into an angular movement of the mirror by means of the mirror suspension assembly, the mirror rotation deflecting a beam of light focussed on a photosensitive film moving at a constant and known velocity. The beam of light traces the time pressure curve on the film.

The advantages of the gauge described in this specification reside in the fact that the weight of the moving parts has been reduced to a large extent by making all members of hollow tubular structure. This reduction in weight raises the natural period of the elastic system. Moreover, by imparting the tubular structure to the components of the gauge it becomes possible to utilize the elastic displacements of the compression member. The compression member extends through the entire length of the gauge, and nearly its entire length now contributes to the sensitivity of the gauge to approximately 2.4 times the sensitivity of the known devices. This gain in sensitivity is not accomplished wholly at the expense of the natural frequency of the system, since there has been a reduction in the weight of the system which offsets the lowering of the natural frequency because of the increased sensitivity. The relative elasticities of the tension spring and of the compression springs may be controlled by controlling their cross-sectional areas. When these areas are equal, then the stresses in the springs are equal. Equal stressing enables one to utilize the available metal in the springs to an equal extent.

It is believed that the construction and operation of the disclosed mechanical gauge as well as the many advantages thereof will be apparent from the foregoing description. It will, therefore, be apparent that while I have shown and described my invention in a preferred form, many changes and modifications may be made without departing from the spirit of the invention as sought to be defined in the appended claims.

The member 21 being fitted within the one 13, the two may be said to be in nested relation. The spring 13 being fixed by the head 12 at its inner end, the outer ends of the springs 13 and 21 being screwed together at 25 and 50 and the end of the spring 21 being linked to the registering device, the pressure of an explosion acting on the piston 21 is transmitted from end to end of the member 21 and then back through the spring 13 end to end to the head 12. Thus the pressure forces operating on the piston act longitudinally throughout the length of the two springs in train, and in consequence they may be said to be connected in series in this sense.

I claim:

1. In a device for recording the nearly instantaneous changes in pressure developed by the products of an explosion, a mounting body having a bore therein, a tension member anchored at one end of said body and longitudinally expandable therein, a compression member secured to the free end of said tension member and extending toward said anchored end of the tension member and longitudinally compressible therein, said tension and compression members being tubular and of equal cross-sectional area, a piston arranged slidably in said bore so as to be exposed to the wave front of the expanding gases resulting from an explosion adjacent said bore, said piston engaged with the free end of said compression member for conveying the pressure effects to said tension and compression members, whereby the former is elongated and the latter is compressed, a push rod engaged at one end with said piston and slidably engaged within and against said compression member intermediately of the length of the latter, and means engaged with the other end of said push rod for registering the combined elongation and compression of said tension and compression members.

2. A mechanical pressure gauge comprising a support, a head engaged fixedly with the support, a rectilinear cylindrical tension spring integrally formed with said head, a bore of uniform diameter being formed through said head and through said tension spring, a hollow cylinder compression spring nested within and fitted slidably to said bore and extending substantially through the length of said bore, a piston fitted to the bore at the end of said compression spring in said head, the other end of said compression spring connected with the free end of said tension spring, a hollow push rod nested within and fitted slidably to said compression member intermediately of the length of the latter and connected to said piston head, and motion registering means connected to the push rod outwardly of said support.

3. A mechanical gauge as in claim 2 in which the cross-sectional areas of said tension spring and said compression spring are equal.

4. A device for recording the nearly instantaneous changes in pressure developed by an explosion in a closed chamber, comprising a main, centrally-bored, externally-threaded plug adapted to be screwed into a threaded hole in said chamber, a centrally-bored head member bearing against the inner end of said plug and having a thin walled tubular tension member projecting therefrom through the bore in said plug, a piston slidable in the bore of said head, a thin walled tubular compression member abutting and extending from said piston through said tension member, said tension and compression members being secured together at their ends distant from the head, the last named ends being guided and slidably supported in the bore of the plug, pressure-indicating means including a movable element mounted outside the plug, and a hollow push rod extending from said piston through said tubular compression member to said movable element, said push rod, compression member, and tension member being concentrically related and relatively slidable one within the other and having appropriate intermediate bearing surfaces therebetween such that the concentrically-related members serve to mutually stiffen and support one another against lateral bending, buckling, or the like.

5. In a device for registering the nearly instantaneous changes in pressure developed by the products of an explosion, including a hollow mount for engagement through the wall of an explosion chamber and open to the chamber, a pressure-responsive movable member therein exposed to the interior of the chamber arranged to be in close proximity with the wave front of the expanding gases resulting from the explosion, a register distant from the chamber, an operative connection between the pressure-responsive member and register, a pair of nested and thin-walled tubular compression and tension members of equal cross-sectional area mutually united at their extremities distant from the chamber, relatively slidable at their opposite extremities and connected respectively to the mount and pressure-responsive member to respond by longitudinal strains to the pressure effects of an explosion on said pressure-responsive member, said tubular members being concentrically arranged and relatively slidable one within the other, the tension member being the external one, said operative connection having also a part slidingly fitted to the inner of said nested members medially of its effective length, whereby to support the same against lateral bending.

6. A device for recording the nearly instantaneous changes in pressure developed by an explosion in a closed chamber, the said device comprising a main, centrally-bored, externally-threaded plug adapted to be screwed into a threaded hole in said chamber, a centrally bored head member bearing against the inner end of said plug and having a tubular tension member projecting therefrom through the bore in said plug, a piston slidable in said head member, a tubular compression member extending from said piston and said head member and through said tension member, said tension and compression members being secured together at their ends distant from the head, motion registering means including an element mounted outside the plug, and a push rod extending from said piston longitudinally through said tubular compression member to said element outside the plug and having a part fitted slidably within and against the compression member intermediately of the length of the latter.

7. In a device for recording the nearly instantaneous changes in pressure developed by explosive reaction in a chamber, a cylinder open at one end for communication with the chamber, a piston slidable in the cylinder, a push rod slidable in the cylinder, a pair of nested tubular members in and coaxial with the cylinder and radially spaced from each other, one of said tubular members fixed to the cylinder at one end, and fixed to the other tubular member at its other end whereby to constitute said tubular members tension and compression elements respectively, said push rod and said other tubular element abutting the outward side of the piston for outward urging thereby, and means to maintain radial spacing between said elements and between the push rod and the adjacent one of said elements medially of each.

NICHOLAS T. VOLSK.

REFERENCES CITED

The following references are of record in the file of this patent:

UNITED STATES PATENTS

| Number | Name | Date |
|---|---|---|
| 1,398,608 | Thring | Nov. 29, 1921 |
| 1,406,616 | Cutts et al. | Feb. 14, 1922 |
| 1,456,847 | Geyer | May 29, 1923 |
| 1,507,555 | Geyer | Sept. 2, 1924 |

FOREIGN PATENTS

| Number | Country | Date |
|---|---|---|
| 55,772 | Germany | Mar. 24, 1891 |
| 310,446 | Great Britain | Apr. 26, 1929 |